US012563142B2

(12) United States Patent
Hamill et al.

(10) Patent No.: US 12,563,142 B2
(45) Date of Patent: Feb. 24, 2026

(54) SYSTEMS, METHODS, AND MEDIA FOR ROUTING TELEPHONE CALLS

(71) Applicant: WiMacTel Canada, Inc., Calgary (CA)

(72) Inventors: Andrew Hamill, Calgary (CA); James Matthew Mackenzie, Calgary (CA)

(73) Assignee: WiMacTel Canada, Inc., Calgary (CA)

( * ) Notice: Subject to any disclaimer, the term of this patent is extended or adjusted under 35 U.S.C. 154(b) by 338 days.

(21) Appl. No.: 18/370,738

(22) Filed: Sep. 20, 2023

(65) Prior Publication Data

US 2025/0097347 A1 Mar. 20, 2025

(51) Int. Cl.
| | |
|---|---|
| *G06Q 30/02* | (2023.01) |
| *H04M 3/42* | (2006.01) |
| *H04M 3/436* | (2006.01) |
| *H04W 4/02* | (2018.01) |
| *H04W 8/18* | (2009.01) |

(52) U.S. Cl.
CPC ....... *H04M 3/436* (2013.01); *H04M 3/42059* (2013.01)

(58) Field of Classification Search
CPC . H04M 3/436; H04M 3/42059; H04M 3/4365
USPC ...................................................... 455/414.1
See application file for complete search history.

(56) References Cited

U.S. PATENT DOCUMENTS

| | | | | |
|---|---|---|---|---|
| 5,887,058 | A * | 3/1999 | Kammath ................ | H04Q 3/42 |
| | | | | 379/268 |
| 6,636,594 | B1 * | 10/2003 | Oran ..................... | H04M 7/128 |
| | | | | 379/93.07 |

| | | | | |
|---|---|---|---|---|
| 6,741,688 | B1 * | 5/2004 | Yau ..................... | H04M 3/4228 |
| | | | | 379/142.01 |
| 7,248,682 | B1 * | 7/2007 | Oran ...................... | H04L 67/14 |
| | | | | 379/93.07 |
| 8,437,457 | B1 * | 5/2013 | Amos ............... | H04M 15/8044 |
| | | | | 379/127.01 |
| 10,565,529 | B1 | 2/2020 | Merritt | |

(Continued)

FOREIGN PATENT DOCUMENTS

| | | |
|---|---|---|
| TW | 201208308 | 2/2012 |

OTHER PUBLICATIONS

IP.com search history (Year: 2025).*

(Continued)

*Primary Examiner* — Moustapha Diaby
(74) *Attorney, Agent, or Firm* — Byrne Poh LLP

(57) ABSTRACT

Mechanisms (which can include, systems, methods, and media) for routing calls are provided. The mechanisms including: receiving a first message containing first information corresponding to a first telephone call; performing a series of queries based on at least a portion of the first information to determine whether the first telephone call matches a route in a first database, wherein at least one of the queries uses a first regular expression; identifying a first route in response to performing the series of queries; and creating a first dial plan based on the first route. In some embodiments, the mechanisms further comprise: determining whether an override route applies to the first telephone call prior to performing the series of queries. In some embodiments, the first telephone call is an external call. In some embodiments, the first information includes trunk group information (TGI) and the first regular expression is evaluated against the TGI.

21 Claims, 3 Drawing Sheets

(56)     References Cited

U.S. PATENT DOCUMENTS

| | | | |
|---|---|---|---|
| 2006/0002380 A1* | 1/2006 | Bollinger | H04L 65/1043 |
| | | | 370/352 |
| 2006/0177039 A1 | 8/2006 | Caballero-McCann et al. | |
| 2009/0067613 A9 | 3/2009 | Holt et al. | |
| 2009/0086947 A1* | 4/2009 | Vendrow | H04M 3/02 |
| | | | 379/201.12 |
| 2009/0279683 A1 | 11/2009 | Gisby et al. | |
| 2012/0021730 A1 | 1/2012 | Vendrow | |
| 2014/0093060 A1 | 4/2014 | Ezell et al. | |
| 2014/0153707 A1* | 6/2014 | Rais | H04L 65/401 |
| | | | 379/196 |
| 2014/0270142 A1 | 9/2014 | Bischoff et al. | |
| 2015/0195695 A1* | 7/2015 | Geiger | H04M 1/72454 |
| | | | 455/404.1 |
| 2017/0187549 A1* | 6/2017 | Terpstra | H04M 7/0075 |
| 2018/0205829 A1 | 7/2018 | Bischoff et al. | |

OTHER PUBLICATIONS

International Search Report and Written Opinion dated Dec. 23, 2024 in International Patent Application No. PCT/CA2024/051165, pp. 1-11.

* cited by examiner

SYSTEMS, METHODS, AND MEDIA FOR ROUTING TELEPHONE CALLS

BACKGROUND

Telephone calls placed by end users may need to be routed to different locations based on a variety of factors. For example, when an end user places a call from a mobile phone to emergency services (e.g., 911), the call may need to be routed to a different emergency dispatch center based on the location of the end user.

Traditionally, routing of calls is done by hard coding rules into software for determining how the call is to be routed. For example, a rule might state that if a call is made to 911 and the user is in a certain geographical region, then the call should be routed to a given emergency dispatch center.

Hard coding of rules is costly to do, requires software modifications which require utmost care, and is slow to complete.

Accordingly, new mechanisms for routing telephone calls are desirable.

SUMMARY

In accordance with some embodiments, mechanisms (which can include systems, methods, and media) for routing telephone calls are provided.

In some embodiments, systems for routing calls are provided, the systems comprise: a memory; and at least one hardware processor that is coupled to the memory and that is configured to at least: receive a first message containing first information corresponding to a first telephone call; perform a series of queries based on at least a portion of the first information to determine whether the first telephone call matches a route in a first database, wherein at least one of the queries uses a first regular expression; identify a first route in response to performing the series of queries; and create a first dial plan based on the first route. In some of these embodiments, the at least one hardware processor is further configured to determine whether an override route applies to the first telephone call prior to performing the series of queries. In some of these embodiments, the first telephone call is an external call. In some of these embodiments, the at least one hardware processor is further configured to: receive a second message containing second information corresponding to a second telephone call, wherein the second telephone call is an internal call; perform a query based on at least a portion of the second information to determine whether the second telephone call matches a route in a second database; identify a second route in response to performing the query; and create a second dial plan based on the second route. In some of these embodiments, the first information includes trunk group information and the first regular expression is evaluated against the trunk group information. In some of these embodiments, the first information includes span information and the first regular expression is evaluated against the span information. In some of these embodiments, the first information includes sent digits information and the first regular expression is evaluated against the sent digits information.

In some embodiments, methods for routing calls are provided, the methods comprising: receiving a first message containing first information corresponding to a first telephone call; performing a series of queries based on at least a portion of the first information to determine whether the first telephone call matches a route in a first database, wherein at least one of the queries uses a first regular expression; identifying a first route in response to performing the series of queries; and creating a first dial plan based on the first route. In some of these embodiments, the method further comprises: determining whether an override route applies to the first telephone call prior to performing the series of queries. In some of these embodiments, the first telephone call is an external call. In some of these embodiments, the method further comprises: receiving a second message containing second information corresponding to a second telephone call, wherein the second telephone call is an internal call; performing a query based on at least a portion of the second information to determine whether the second telephone call matches a route in a second database; identifying a second route in response to performing the query; and creating a second dial plan based on the second route. In some of these embodiments, the first information includes trunk group information and the first regular expression is evaluated against the trunk group information. In some of these embodiments, the first information includes span information and the first regular expression is evaluated against the span information. In some of these embodiments, the first information includes sent digits information and the first regular expression is evaluated against the sent digits information.

In some embodiments, non-transitory computer-readable media containing computer executable instructions that, when executed by a processor, cause the processor to perform a method for routing calls are provided, the method comprising: receiving a first message containing first information corresponding to a first telephone call; performing a series of queries based on at least a portion of the first information to determine whether the first telephone call matches a route in a first database, wherein at least one of the queries uses a first regular expression; identifying a first route in response to performing the series of queries; and creating a first dial plan based on the first route. In some of these embodiments, the method further comprises determining whether an override route applies to the first telephone call prior to performing the series of queries. In some of these embodiments, the first telephone call is an external call. In some of these embodiments, the method further comprises: receiving a second message containing second information corresponding to a second telephone call, wherein the second telephone call is an internal call; performing a query based on at least a portion of the second information to determine whether the second telephone call matches a route in a second database; identifying a second route in response to performing the query; and creating a second dial plan based on the second route. In some of these embodiments, the first information includes trunk group information and the first regular expression is evaluated against the trunk group information. In some of these embodiments, the first information includes span information and the first regular expression is evaluated against the span information. In some of these embodiments, the first information includes sent digits information and the first regular expression is evaluated against the sent digits information.

DETAILED DESCRIPTION

In accordance with some embodiments, mechanisms, which can include systems, methods, and media, for routing telephone calls are provided.

In some embodiments, mechanisms, which can include systems, methods, and media, as described herein, can receive a variety of parameters for a call and determine how to route the call based on a set of rules stored in a database. More particularly, in some embodiments, the mechanisms can determine a type of call to be routed and then determine routing based on the type of call. For example, the determination of routing for system internal calls can different than system external calls, in some embodiments.

In some embodiments, for internal calls, an outbound route can be found by performing one or more queries on a database of outbound routes. These one or more queries can compare a call's parameters to one or more regular expressions (REGEXs) and/or other criteria (or another criterion) of a route in a database to determine if there is a match, in some embodiments. After finding an outbound route, the mechanisms can then create an internal dial plan which can subsequently be used to route the call, in some embodiments.

In some embodiments, for external calls, the call can first be evaluated to determine if there is an override route for the call. This can be determined by performing one or more queries on a database of override routes, in some embodiments. These one or more queries can compare a call's parameters to one or more REGEXs and/or other criteria (or another criterion) of a route in a database to determine if there is a match, in some embodiments. If no override route is found, then, in some embodiments, the mechanisms can perform a series of queries against a database on inbound routes. Thise series of queries can compare a call's parameters to one or more REGEXs and/or other criteria (or another criterion) of a route in a database to determine if there is a match. After finding an inbound route, the mechanisms can then create an external dial plan which can subsequently be used to route the call, in some embodiments.

Figure 1:
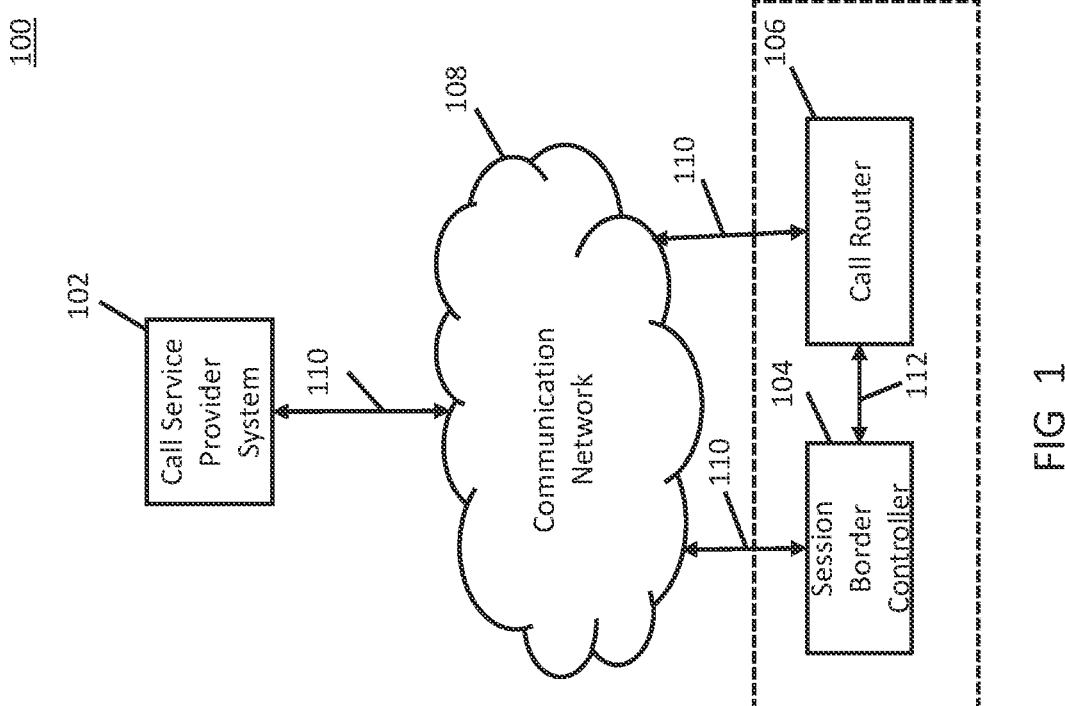
FIG. 1 shows an example of an architecture of a portion of a telephone system including a call router in accordance with some embodiments.

Turning to FIG. 1, an example 100 of an architecture of a portion of a telephone system including a call router in accordance with some embodiments of the disclosed subject matter is shown. As illustrated, architecture 100 can include a call service provider system 102, a session border controller 104, a call router 106, and a communication network 108, in some embodiments.

Although particular numbers of particular devices are illustrated in FIG. 1, any suitable number(s) of each device shown, and any suitable additional or alternative devices, can be used in some embodiments. For example, one or more additional devices, such as servers, computers, routers, firewalls, gateways, networks, etc., can be included in some embodiments. As another example, any suitable number of call service providers systems (including only one) can be included in some embodiments. As yet another example, any suitable number of session border controllers (including only one) can be included in some embodiments. As still another example, any suitable number of call routers (including only one) can be included in some embodiments. In some embodiments, a session border controller and a call router can be combined into one device.

Call service provider system 102 can be any suitable call service provider system that handles telephone calls, in some embodiments. For example, in some embodiments, call service provider system 102 can be a system of a telecommunication carrier needing to have a call processed, handled, and/or routed.

Session border controller 104 be any suitable device capable of providing an interface between call service provider system 102, call router 106, and/or any other systems (not shown), in some embodiments. For example, in some embodiments, session border controller 104 can be a server that provides a gateway between a call service provider system and a call router. As a more particular example, in some embodiments, session border controller 104 can be implemented using or based on FreeSWITCH, which is available from https://signalwire.com/freeswitch (which is hereby incorporated by reference herein in its entirety).

Call router 106 can be any suitable device capable of routing calls, in some embodiments. For example, call router 106 can be a server that performs at least some of the functions described below in connection with FIG. 3, in some embodiments. Call router 106 can additionally or alternatively perform functions other than those described below in connection with FIG. 3, in some embodiments.

Communication network 108 can be any suitable combination of one or more wired and/or wireless networks, in some embodiments. For example, in some embodiments, communication network 108 can include any one or more of the Internet, a mobile data network, a satellite network, a local area network, a wide area network, a telephone network, a cable television network, a WiFi network, a WiMax network, and/or any other suitable communication network.

Call service provider system 102, session border controller 104, and call router 106 can be connected by one or more communications links 110 to communication network 108, in some embodiments. These communications links can be any communications links suitable for communicating data among call service provider system 102, session border controller 104, call router 106, and communication network 108, such as network links, dial-up links, wireless links, hard-wired links, routers, switches, any other suitable communications links, or any suitable combination of such links, in some embodiments.

Session border controller 104 and call router 106 can be connected by one or more communications links 112, in some embodiments. These communications links can be any communications links suitable for communicating data among session border controller 104 and call router 106, such as network links, dial-up links, wireless links, hard-wired links, routers, switches, any other suitable communications links, or any suitable combination of such links, in some embodiments.

Figure 2:
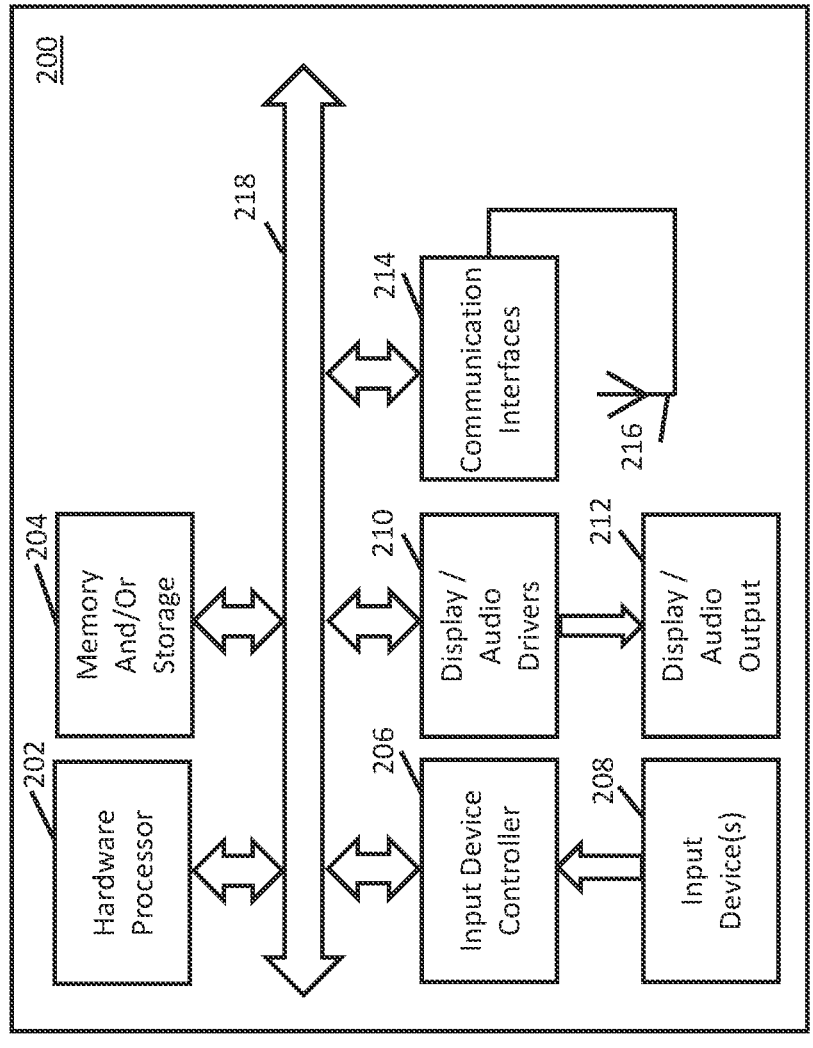
FIG. 2 shows an example of hardware that can be used for certain of the components shown in FIG. 1 in accordance with some embodiments.

Session border controller 104 and call router 106 can be implemented using any suitable hardware, in some embodiments. For example, in some embodiments, session border controller 104 and call router 106 can be implemented using any suitable general-purpose computer(s) or special-purpose computer(s). For example, session border controller 104 and call router 106 can be implemented using one or more special-purpose computers, such as one or more Linux servers, in some embodiments. Any such general-purpose computer or special-purpose computer can include any suitable hardware, in some embodiments. For example, as illustrated in example hardware 200 of FIG. 2, such hardware can include a hardware processor 202, memory and/or storage 204, an input device controller 206, an input device 208, display/audio drivers 210, display and audio output circuitry 212, communication interface(s) 214, an antenna 216, and a bus 218, in some embodiments.

Hardware processor 202 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 204 can be any suitable memory and/or storage for storing programs, data, and/or any other suitable information in some embodiments. For example, in some embodiments, memory and/or storage 204 can include random access memory, read-only memory, flash memory, hard disk storage, optical media, and/or any other suitable memory.

Input device controller 206 can be any suitable circuitry for controlling and receiving input from input device(s) 208 in some embodiments. For example, in some embodiments, input device controller 206 can be circuitry for receiving input from an input device 208, such as a touch screen, from one or more buttons, from a voice recognition circuit, from a microphone, and/or from any other type of input device.

Display/audio drivers 210 can be any suitable circuitry for controlling and driving output to one or more display/audio output circuitries 212 in some embodiments. For example, in some embodiments, display/audio drivers 210 can be circuitry for driving one or more display/audio output circuitries 212, such as an LCD display, a speaker, an LED, or any other type of output device.

Communication interface(s) 214 can be any suitable circuitry for interfacing with one or more communication networks, such as network 108 as shown in FIG. 1, in some embodiments. For example, in some embodiments, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can additionally or alternatively be included in hardware 200 in accordance with some embodiments.

Figure 3:
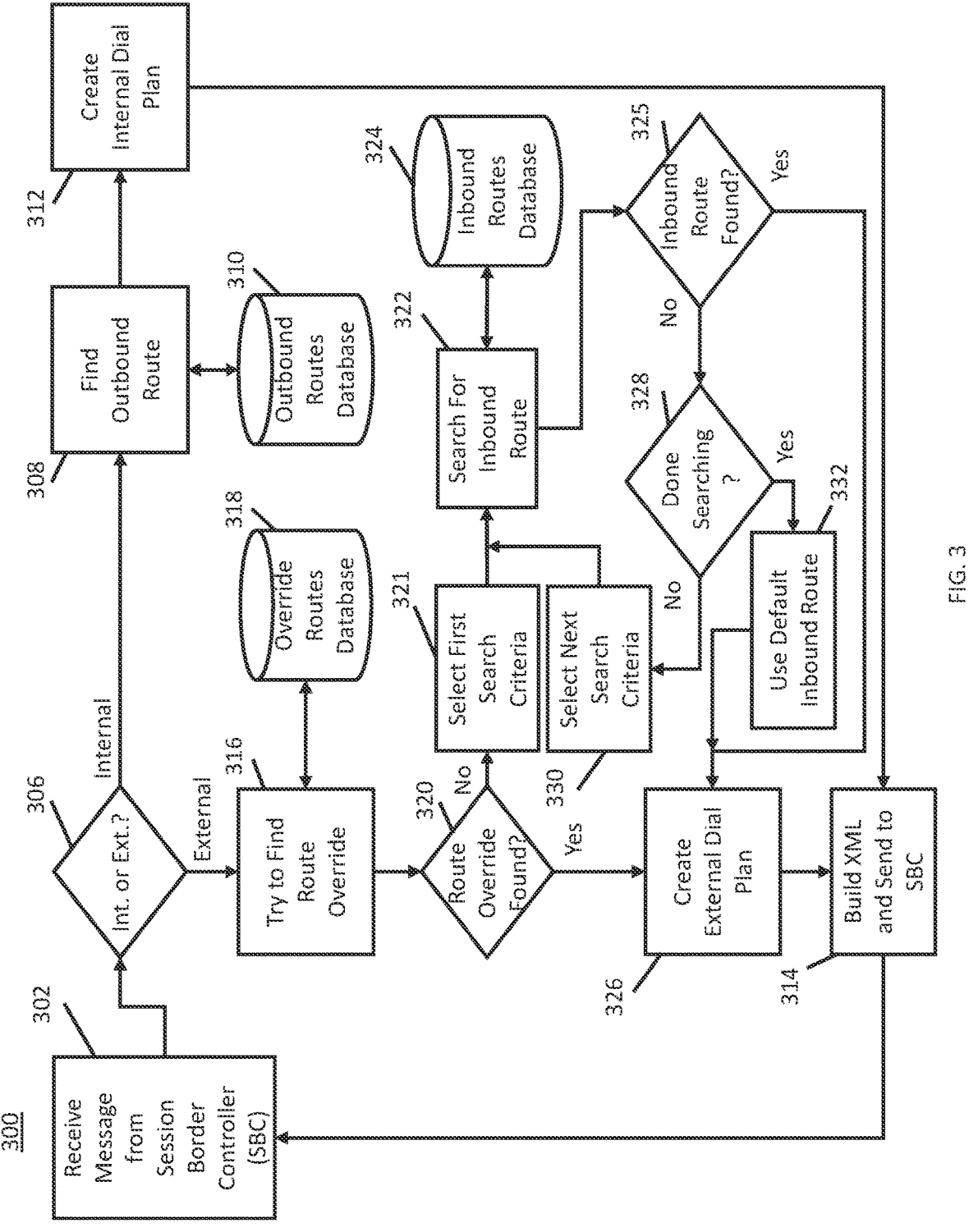
FIG. 3 shows an example of a process for routing calls in accordance with some embodiments.

Turning to FIG. 3, an example 300 of a process for routing a call in accordance with some embodiments is illustrated. Process 300 can be executed by any suitable device such as by a hardware processor of call router 106 of FIG. 1, in some embodiments.

As shown, at 302, process 300 begins by receiving a message for a call from a session border controller, such as session border controller 104 of FIG. 1, in some embodiments.

The message can have any suitable content, in some embodiments. This message can be based on a message received by the session border controller from a call service provider system, such as call service provider system 102 of FIG. 1, in some embodiments.

For example, in some embodiments, messages for calls originating via Session Initiation Protocol (SIP) within a call service provider system (e.g., system 102 of FIG. 1) and routing directly to a session border controller (SBC) (e.g., SBC 104) of the call service provider can include:

trunk group identifier (tgrp)—an identifier that represents a trunk group that a call came in on, and, if present, that can be used to determine which account the call is assigned to;

context—an identifier of whether a call is internal or external;

sent digits—the digits an end-user dialed which resulted in the call reaching the call router; and an originating number—an identifier of an originating call number (in some embodiments, a charge number can be used as the originating number when it is present, and if a charge number is not present, the calling number can be used as the originating number).

As another example, in some embodiments, messages for calls originating via physical trunking within a call service provider system (e.g., system 102 of FIG. 1) which utilize media gateways to convert the call to SIP prior to routing to a session border controller (SBC) (e.g., SBC 104) of the call service provider can include:

a span identifier—an identifier for a group of switches associated with a call;

a channel identifier—an identifier of one or more SIP channel numbers associated with a call;

sent digits—the digits an end-user dialed to reach the call router; and an originating number—an identifier of an originating call number (in some embodiments, the charge number can be used as the originating number when it is present, and if the charge number is not present, the calling number can be used as the originating number).

The message can be any suitable type of message received using any suitable protocol, in some embodiments. For example, in some embodiments, the message can be a Hyper-Text Transfer Protocol (HTTP) Post request.

The message can be received from any suitable session border controller in some embodiments. For example, in some embodiments, the session border controller can be session border controller 104 shown and described in connection with FIG. 1.

Next, at 306, process 300 can determine if the message is for an internal call or an external call. In accordance with some embodiments, an internal call can be a call that was previously received by another part of a system that includes the call router and is receiving further processing in the call router in an effort to route the call out of the system. In accordance with some embodiments, an external call can be a call that has been newly received by a system that includes the call router for processing.

The determination of whether the message is for an internal call or an external call can be made in any suitable manner, in some embodiments. For example, in some embodiments, the determination can be made based on the contents of the message received at 302. More particularly, for example, the determination can be made based on an indicator of whether message is for an internal call or an external call that is included in the message received at 302, in some embodiments.

If it is determined at 306 that the message is for an internal call, then at 308, process 300 can find an outbound route for the call. An outbound route for the call can be found in any suitable manner in some embodiments. For example, in some embodiments, an outbound route for the call can be found by performing one or more queries of a database 310 of outbound routes and evaluating REGEX rules in the results of the one or more queries to determine which route is applicable.

Database 310 can be any suitable database, such as a MYSQL database in some embodiments.

Database 310 can include any suitable information, such as information defining one or more outbound routes and, for each, parameters that cause a call to use that outbound route. For example, in some embodiments, the information can include one or more of the following for each outbound route:

- sequence identifier (seq)—an order identifier for a series of queries stored in the database
- call identification code (call identification_code)—an identifier (that can be expressed as a regular expression, in some embodiments) of an identification code that a call would need to have to match the outbound route;
- REGEX rules—one or more regular expressions that can be used to determine whether a call matches the outbound route;
- completion info id—an identifier of a function to be performed on the call; and
- channel variables (channel_vars)—one or more variables defining a function to be performed on the call and parameters to be used in performing the function (e.g., playing a certain message, routing the call to a certain destination, populating SIP headers for the call with certain information and sending the call to a certain destination, etc.).

Performing one or more queries of database 310 of outbound routes can be performed in any suitable manner, in some embodiments. For example, in some embodiments, performing one or more queries of a database of outbound routes can be performed using one or more of the following queries:

```
db.query( 'select * from [database 310] where call_identification_code =
? order by seq', [call_identification_code] )
db.query( 'select * from [database 310] where call_identification_code =
[NULL] order by seq' )
```

In some embodiments, if an outbound route is not found in database 310, a default outbound route can be used in some embodiments. Any suitable default outbound route can be used in some embodiments.

After finding an outbound route or determining to use a default outbound route, in some embodiments, process 300 can create an internal dial plan at 312. An internal dial plan can be created in any suitable manner, can have any suitable content, and can be created in any suitable format, in some embodiments. For example, in some embodiments, an internal dial plan can be created based on an outbound route found at 308. As another example, in some embodiments, an internal dial plan can include any suitable content, such as information for forwarding the call to an automatic call distributor (ACD) with the correct agent queue to handle the call, in some embodiments. As still another example, in some embodiments, the internal dial plan can be created in a JSON format, or any other suitable format. An example of a dial plan in JSON format in accordance with some embodiments is shown below:

```
{
  "data": {
    "@name": "dialplan",
    "@description": "Dial Plan For FreeSwitch",
    "context": [
      {
        "@name": "external",
        "extension": [
          {
            "@name": "OA-CALL-TO-001.01",
            "condition": [
              {
                "@field": "destination_number",
                "@expression": ".*",
                "action": [
                  {
                    "@application": "export",
                    "@data": "sip_from_uri=null@undefined"
                  },
                  {
                    "@application": "export",
                    "@data": "effective_caller_id_number=null"
                  },
                  {
                    "@application": "set",
                    "@data": "hangup_after_bridge=True"
                  },
                  { "@application": "set", "@data": "continue_on_fail=True" },
                  { "@application": "set", "@data": "originate_timeout=2" },
                  { "@application": "export", "@data": "originate_timeout=2" },
                  { "@application": "set", "@data": "max_forwards=70" },
                  { "@application": "export", "@data": "max_forwards=70" },
                  {
                    "@application": "export",
                    "@data": "sip_h_X-tmgsbcapi_Extension=OA-CALL-TO-001.01"
                  },
                  {
                    "@application": "export",
                    "@data": "sip_h_X-ivr_initial_python_file=Telco_init"
                  },
                  {
                    "@application": "export",
                    "@data": "sip_h_X-sbc_customer=Telco"
```

-continued

```
            },
            {
                "@application": "export",
                "@data": "sip_h_X-sbc_subcustomer=TELCO"
            },
            {
                "@application": "export",
                "@data": "sip_h_X-sbc_calltype=OSP"
            },
            {
                "@application": "export",
                "@data": "sip_h_X-
telco_extra_cdr_params={'span':'',''channel':'',''tgrp':''}"
            },
            {
                "@application": "bridge",
                "@data": "system/gateway/server/null"
            }
          ]
        }
      ]
    }
  ]
}
}
```

Next, at 314, process can build an XML dial plan based on the created dial plan and send the XML dial plan to the session border controller at 314. The XML file can be built in any suitable manner, in some embodiments. For example, in some embodiments, the XML dial plan can be built by converting the dial plan in a JSON format to a dial plan in an XML format. An example of a dial plan in JSON format in accordance with some embodiments is shown below:

for a new message for a call from the session border controller and proceed as described herein, in some embodiments.

Referring back to 306, if it is determined at 306 that the message is for an external call, then at 316 process 300 can try to find a route override for the call corresponding to the message. Process 300 can try to find a route override for the message in any suitable manner, in some embodiments. For

```
<document type="freeswitch/xml">
  <section name="dialplan" description="Dial Plan For FreeSwitch">
    <context name="external">
      <extension name="OA-CALL-TO-001.01">
        <condition field="destination_number" expression=".*">
          <action application="export" data="sip_from_uri=null@undefined"/>
          <action application="export" data="effective_caller_id_number=null"/>
          <action application="set" data="hangup_after_bridge=True"/>
          <action application="set" data="continue_on_fail=True"/>
          <action application="set" data="originate_timeout=2"/>
          <action application="export" data="originate_timeout=2"/>
          <action application="set" data="max_forwards=70"/>
          <action application="export" data="max_forwards=70"/>
          <action application="export" data="sip_h_X-tmgsbcapi_Extension=OA-
CALL-TO-001.01"/>
          <action application="export" data="sip_h_X-
ivr_initial_python_file=Telco_init"/>
          <action application="export" data="sip_h_X-sbc_customer=Telco"/>
          <action application="export" data="sip_h_X-sbc_subcustomer=TELCO"/>
          <action application="export" data="sip_h_X-sbc_calltype=OSP"/>
          <action application="export" data="sip_h_X-
telus_extra_cdr_params={'span':'',''channel':'',''tgrp':''}"/>
          <action application="bridge" data="system/gateway/server/null"/>
        </condition>
      </extension>
    </context>
  </section>
</document>
```

The XML dial plan can be sent to the session border controller in any suitable manner, in some embodiments. For example, in some embodiments, the XML dial plan can be sent to the session border controller using a Hyper-Text Transfer Protocol (HTTP) Post request.

Once the XML dial plan has been sent to the session border controller, process 300 can loop back to 302 to wait example, in some embodiments, process 300 can try to find a route override for the message by searching database 318 of route overrides.

Database 318 can be any suitable database, such as a MYSQL database in some embodiments.

Database 318 can include any suitable information, such as information defining one or more override routes and, for each, parameters that cause a call to use that override route. For example, in some embodiments, the information can include one or more of the following for each override route:

reference—a unique identifier of the override route;

modified on—an indicator of when this database entry was last modified;

originating number—an identifier of one or more originating call numbers (in some embodiments, a charge number can be used as the originating number when it is present, and if the charge number is not present, the calling number can be used as the originating number) that a call would need to have in order to match the override route;

sent digits—an identifier of the digits an end-user would have had to have dialed in order for the call to match the override route;

call arrival reference—a reference that can be used to access a call identification code in database 324 using a query such as "db.query('select * from [database 324] ir join ivr_distribution_info idi on ir.ivr_distribution_info_id=idi.id where call_identification_code=?', [row.call_arrival_reference])"; and sent type—an identifier that defines the type of match expected for the sent digits field that can be used to determine whether a call matches the override route

12 match in which the sent digits match a pattern (e.g., a pattern starting with 0 and then any 10 digit number)).

In some embodiments, the sent digits can be stored as a regular expression (REGEX) and long distance numbers can include a REGEX to allow an optional +1 or 1 as leading digits (e.g., "^+?1?"). For example, in some embodiments, the REGEX can be " ", "^1?411$", "^0(?!(403|780))[2-9][0-9]{6}", or any other suitable value.

In some embodiments, the originating number can be stored as a REGEX that can be used to match an originating caller number for call identification. In some embodiments, for long distance numbers, the REGEX can include an optional +1 or 1 as leading digits (e.g., "^\+?1?"). In some embodiments, the originating number may only be populated for exact matches of the full number or partial matches like NPA. For example, in some embodiments, the REGEX can be "^1?(222)[2-9][0-9]{6}$", "^?(?!333)[2-9][0-9]{2}[2-9][0-9]{6}$", "^1?9786543210$", or any other suitable value. In some embodiments, if any originating number is acceptable, this parameter can be left blank.

Searching database 318 of override routes can be performed in any suitable manner, in some embodiments. For example, in some embodiments, searching database 318 of outbound routes can be performed by performing a query as follows:

```
db.query(
    'select * from telco_call_arrival_identification_overrides where
originating_number = ? and sent_digits != "" and ? regexp sent_digits and
sent_type = 1',
    [originating_number, sent_digits]
)
    .then((rows) => {
        if (rows.length > 0) resolve(rows[0]);
        else {
            db.query(
                'select * from telco_call_arrival_identification_overrides where
originating_number = ? and sent_digits != "" and ? regexp sent_digits and
sent_type = 2',
                [originating_number, sent_digits]
            ).then((rows) => {
                if (rows.length > 0) resolve(rows[0]);
                else {
                    db.query(
                        'select * from telco_call_arrival_identification_overrides where
originating_number = ? and sent_digits != "" and ? regexp sent_digits and
sent_type = 3',
                        [originating_number, sent_digits]
                    ). then((rows) => {
                        if (rows.length > 0) resolve(rows[0]);
                        else {
                            db.query(
                                'select * from telco_call_arrival_identification_overrides where
originating_number = ? and sent_type = ""',
                                [originating_number]
                            ).then((rows) => {
                                if (rows.length > 0) resolve(rows[0]);
                                else {
                                    reject( );
                                }
                            });
                        }
                    });
                }
            });
        }
    })
```

(e.g., "1" indicates an exact match of the full sent digits like "711", "2" indicates a partial match of the sent digits (e.g., a match of only a portion of the sent digits like NPA or 5551212), and "3" indicates a general After trying to find a route override for the message at 316, process 300 can determine if a route override was found at 320. If a route override for the message was determined as not being found, then process 300 can find an inbound route for the call. An inbound route for the call can be found in any suitable manner in some embodiments.

For example, in some embodiments, an inbound route for the call can be found by repeatedly searching a database 324 of inbound routes.

Database 324 can be any suitable database, such as a MYSQL database in some embodiments.

Database 324 can include any suitable information, such as information defining one or more inbound routes and, for each, parameters that cause a call to use that inbound route. For example, in some embodiments, the information can include one or more of the following for each inbound route:

a route identifier—an identifier to uniquely identify the route;

a call identification code—an identifier (which can be expressed as a regular expression, in some embodiments) for an external call that can be used to determine whether the call matches the inbound route;

sent digits—an identifier of the digits an end-user would need to have dialed in order for a call to match the inbound route;

trunk group identifier (tgrp)—an identifier that represents one or more trunk groups that a call would need to have come in on in order for the call to match the inbound route;

a span identifier (span)—an identifier of a group of switches that a call would need to have to be associated with in order to match the inbound route;

originating number—an identifier of one or more originating call numbers (in some embodiments, a charge number can be used as the originating number when it is present, and if the charge number is not present, the calling number can be used as the originating number) that a call would need to have in order to match the inbound route;

channel—an identifier of one or more SIP channel numbers that a call would need to be associated with in order to match the inbound route;

call type—an identifier of a type of call (e.g., operator services (e.g., operator assistance and emergency service calls), message relay service, directory assistance, IP relay, etc.) (which can be expressed as a regular expression, in some embodiments) that a call would need to have to match the inbound route;

originating call type (orig type)—an identifier of the type of match expected for an originating number field that can be used to determine whether a call matches the inbound route (e.g., "1" indicates an exact match of the full originating number, and "2" indicates a partial match of the originating number (e.g., a match of only a portion of the originating number like numbering plan area (NPA));

sent type—an identifier of the type of match expected for the sent digits field that can be used to determine whether a call matches the inbound route (e.g., "1" indicates an exact match of the full sent digits like "711", "2" indicates a partial match of the sent digits (e.g., a match of only a portion of the sent digits like NPA or 5551212), and "3" indicates a general match in which the sent digits match a pattern (e.g., a pattern starting with 0 and then any 10 digit number));

customer—an identifier of a customer operating a call service provider system (e.g., call service provider system 102 of FIG. 1) (which can be expressed as a regular expression, in some embodiments) that a call would need to have in order for the call to match the inbound route;

sub-customer—an identifier of a sub-customer operating a call service provider system (e.g., call service provider system 102 of FIG. 1) (which can be expressed as a regular expression, in some embodiments) that a call would need to have in order for the call to match the inbound route;

destination system component—an identifier of a system component to which the call is to be routed;

context—an identifier of whether a call is internal or external (which can be expressed as a regular expression, in some embodiments) that a call would need to have in order for the call to match the inbound route; and language—an identifier of a language to be used in servicing the call.

In some embodiments, the sent digits can be stored as a regular expression (REGEX) and long distance numbers can include a REGEX to allow an optional +1 or 1 as leading digits (e.g., "^+?1?"). For example, in some embodiments, the REGEX can be " ", "^1?411$", "^0(?!(403|780))[2-9][0-9]{6}", or any other suitable value.

In some embodiments, the tgrp can be stored as a REGEX that enforces length and exact match. For example, in some embodiments, the REGEX can be "^DBLOOKUP$", "^LUPIDENT$", or any other suitable value. In some embodiments, if not required, tgrp can be left blank.

In some embodiments, the span can be stored as a REGEX that enforces length and exact match, or tests portion of full span. For example, in some embodiments, the REGEX can be "^LOC_ROUTE_ID_1$", "^LOC_ROUTE_ID_1$", or any other suitable value. In some embodiments, if not required, this can be left blank.

In some embodiments, the originating number can be stored as a REGEX that can be used to match an originating caller number for call identification. In some embodiments, for long distance numbers, the REGEX can include an optional +1 or 1 as leading digits (e.g., "^+?1?"). In some embodiments, the originating number may only be populated for exact matches of the full number or partial matches like NPA. For example, in some embodiments, the REGEX can be "^1?(222)[2-9][0-9]{6}$", "^?(?!333)[2-9][0-9]{2}[2-9][0-9]{6}$", "^1?9786543210$", or any other suitable value. In some embodiments, if any originating number is acceptable, this parameter can be left blank.

In some embodiments, the channel can be stored as a REGEX. In some embodiments, channel may only be used if span is populated. For example, in some embodiments, the REGEX can be "^([7-9]|1[0-2])$" or any other suitable value. In some embodiments, if not required, this can be left blank.

In searching database 324, process can initially select a first search criteria at 321, in some embodiments. Any suitable search criteria can be selected in some embodiments. For example, in some embodiments, process can select the first of the numbered search criteria shown in the table below:

| Search Criteria | Where | paraMap |
|---|---|---|
| 1 | where: `tgrp != "" and ? regexp tgrp and span = "" and channel = "" and sent_digits != "" and ? regexp sent_digits and originating_number != "" and ? regexp originating_number and sent_type = "1" and orig_type="1"` | paramMap: (p) => [p.tgrp, p.sentdigits, p.orignum] |
| | where: `tgrp != "" and ? regexp tgrp and span = "" and channel = "" and sent_digits != "" and ? regexp sent_digits and originating_number != "" and ? regexp originating_number and sent_type = "2" and orig_type="1"` | paramMap: (p) => [p.tgrp, p.sentdigits, p.orignum] |
| 3 | where: `tgrp != "" and ? regexp tgrp and span = "" and channel = "" and sent_digits != "" and ? regexp sent_digits and originating_number != "" and ? regexp originating_number and sent_type = "3" and orig_type="1"` | paramMap: (p) => [p.tgrp, p.sentdigits, p.orignum] |
| 4 | where: `tgrp != "" and ? regexp tgrp and span = "" and channel = "" and sent_digits != "" and ? regexp sent_digits and originating_number != "" and ? regexp originating_number and sent_type = "1" and orig_type="2"` | paramMap: (p) => [p.tgrp, p.sentdigits, p.orignum] |
| 5 | where: `tgrp != "" and ? regexp tgrp and span = "" and channel = "" and sent_digits != "" and ? regexp sent_digits and originating_number != "" and ? regexp originating_number and sent_type = "2" and orig_type="2"` | paramMap: (p) => [p.tgrp, p.sentdigits, p.orignum] |
| 6 | where: `tgrp != "" and ? regexp tgrp and span = "" and channel = "" and sent_digits != "" and ? regexp sent_digits and originating_number != "" and ? regexp originating_number and sent_type = "3" and orig_type="2"` | paramMap: (p) => [p.tgrp, p.sentdigits, p.orignum] |
| 7 | where: `tgrp != "" and ? regexp tgrp and span = "" and channel = "" and sent_digits != "" and ? regexp sent_digits and originating_number = "" and sent_type = "1"` | paramMap: (p) => [p.tgrp, p.sentdigits] |
| 8 | where: `tgrp != "" and ? regexp tgrp and span = "" and channel = "" and sent_digits != "" and ? regexp sent_digits and originating_number = "" and sent_type = "2"` | paramMap: (p) => [p.tgrp, p.sentdigits] |
| 9 | where: `tgrp != "" and ? regexp tgrp and span = "" and channel = "" and sent_digits != "" and ? regexp sent_digits and originating_number = "" and sent_type = "3"` | paramMap: (p) => [p.tgrp, p.sentdigits] |
| 10 | where: `tgrp != "" and ? regexp tgrp and span = "" and channel = "" and sent_digits = "" and originating_number != "" and ? regexp originating_number and orig_type = "1"` | paramMap: (p) => [p.tgrp, p.orignum] |
| 11 | where: `tgrp != "" and ? regexp tgrp and span = "" and channel = "" and sent_digits = "" and originating_number != "" and ? regexp originating_number and orig_type = "2"` | paramMap: (p) => [p.tgrp, p.orignum] |
| 12 | where: `tgrp != "" and ? regexp tgrp and span = "" and channel = "" and sent_digits = "" and originating_number = ""` | paramMap: (p) => [p.tgrp] |
| 13 | where: `tgrp = "" and span != "" and ? regexp span and channel != "" and ? regexp channel and sent_digits != "" and ? regexp sent_digits and originating_number != "" and ? regexp originating_number and sent_type = "1" and orig_type="1"` | paramMap: (p) => [p.span, p.channel, p.sentdigits, p.orignum] |
| 14 | where: `tgrp = "" and span != "" and ? regexp span and channel != "" and ? regexp channel and sent_digits != "" and ? regexp sent_digits and originating_number != "" and ? regexp originating_number and sent_type = "2" and orig_type="1"` | paramMap: (p) => [p.span, p.channel, p.sentdigits, p.orignum] |
| 15 | where: `tgrp = "" and span != "" and ? regexp span and channel != "" and ? regexp channel and sent_digits != "" and ? regexp sent_digits and originating_number != "" and ? regexp originating_number and sent_type = "3" and orig_type="1"` | paramMap: (p) => [p.span, p.channel, p.sentdigits, p.orignum] |
| 16 | where: `tgrp = "" and span != "" and ? regexp span and channel != "" and ? regexp channel and sent_digits != "" and ? regexp sent_digits and originating_number != "" and ? regexp originating_number and sent_type = "1" and orig_type="2"` | paramMap: (p) => [p.span, p.channel, p.sentdigits, p.orignum] |
| 17 | where: `tgrp = "" and span != "" and ? regexp span and channel != "" and ? regexp channel and sent_digits != "" and ? regexp sent_digits and originating_number != "" and ? regexp originating_number and sent_type = "2" and orig_type="2"` | paramMap: (p)=> [p.span, p.channel, p.sentdigits, p.orignum] |
| 18 | where: `tgrp = "" and span != "" and ? regexp span and channel != "" and ? regexp channel and sent_digits != "" and ? regexp sent_digits and originating_number != "" and ? regexp originating_number and sent_type = "3" and orig_type="2"` | paramMap: (p)=> [p.span, p.channel, p.sentdigits, p.orignum] |
| 19 | where: `tgrp = "" and span != "" and ? regexp span and channel != "" and ? regexp channel and sent_digits != "" and ? regexp sent_digits and originating_number = "" and sent_type = "1"` | paramMap: (p) => [p.span, p.channel, p.sentdigits] |

-continued

| Search Criteria | Where | paraMap |
|---|---|---|
| 20 | where: 'tgrp = "" and span != "" and ? regexp span and channel != "" and ? regexp channel and sent_digits != "" and ? regexp sent_digits and originating_number = "" and sent_type = "2"' | paramMap: (p) => [p.span, p.channel, p.sentdigits] |
| 21 | where: 'tgrp = "" and span != "" and ? regexp span and channel != "" and ? regexp channel and sent_digits != "" and ? regexp sent_digits and originating_number = "" and sent_type = "3"' | paramMap: (p) => [p.span, p.channel, p.sentdigits] |
| 22 | where: 'tgrp = "" and span != "" and ? regexp span and channel != "" and ? regexp channel and sent_digits = "" and originating_number != "" and ? regexp originating_number and orig_type="1"' | paramMap: (p) => [p.span, p.channel, p.orignum] |
| 23 | where: 'tgrp = "" and span != "" and ? regexp span and channel != "" and ? regexp channel and sent_digits = "" and originating_number != "" and ? regexp originating_number and orig_type="2"' | paramMap: (p) => [p.span, p.channel, p.orignum] |
| 24 | where: 'tgrp = "" and span != "" and ? regexp span and channel != "" and ? regexp channel and sent_digits = "" and originating_number = ""' | paramMap: (p) => [p.span, p.channel] |
| 25 | where: 'tgrp = "" and span != "" and ? regexp span and channel = "" and sent_digits != "" and ? regexp sent_digits and originating_number != "" and ? regexp originating_number and sent_type="1" and orig_type="1"' | paramMap: (p) => [p.span, p.channel] |
| 26 | where: 'tgrp = "" and span != "" and ? regexp span and channel = "" and sent_digits != "" and ? regexp sent_digits and originating_number != "" and ? regexp originating_number and sent_type="2" and orig_type="1"' | paramMap: (p) => [p.span, p.sentdigits, p.orignum] |
| 27 | where: 'tgrp = "" and span != "" and ? regexp span and channel = "" and sent_digits != "" and ? regexp sent_digits and originating_number != "" and ? regexp originating_number and sent_type="3" and orig_type="1"' | paramMap: (p) => [p.span, p.sentdigits, p.orignum] |
| 28 | where: 'tgrp = "" and span != "" and ? regexp span and channel = "" and sent_digits != "" and ? regexp sent_digits and originating_number != "" and ? regexp originating_number and sent_type="1" and orig_type="2"' | paramMap: (p) => [p.span, p.sentdigits, p.orignum] |
| 29 | where: 'tgrp = "" and span != "" and ? regexp span and channel = " and sent_digits != "" and ? regexp sent_digits and originating_number != "" and ? regexp originating_number and sent_type="2" and orig_type="2"' | paramMap: (p) => [p.span, p.sentdigits, p.orignum] |
| 30 | where: 'tgrp = "" and span != "" and ? regexp span and channel = "" and sent_digits != "" and ? regexp sent_digits and originating_number != "" and ? regexp originating_number and sent_type="3" and orig_type="2"' | paramMap: (p)=> [p.span, p.sentdigits, p.orignum] |
| 31 | where: 'tgrp = "" and span != "" and ? regexp span and channel = "" and sent_digits != "" and ? regexp sent_digits and originating_number = "" and sent_type="1"' | paramMap: (p) => [p.span, p.sentdigits] |
| 32 | where: 'tgrp = "" and span != "" and ? regexp span and channel = "" and sent_digits != "" and ? regexp sent_digits and originating_number = "" and sent_type="2"' | paramMap: (p) => [p.span, p.sentdigits] |
| 33 | where: 'tgrp = "" and span != "" and ? regexp span and channel = "" and sent_digits != "" and ? regexp sent_digits and originating_number = "" and sent_type="3"' | paramMap: (p)=> [p.span, p.sentdigits] |
| 34 | where: 'tgrp = "" and span != "" and ? regexp span and channel = "" and sent_digits = "" and originating_number != "" and ? regexp originating_number and orig_type="1" | paramMap: (p) => [p.span, p.sentdigits, p.orignum] |
| 35 | where: 'tgrp = "" and span != "" and ? regexp span and channel = "" and sent_digits = "" and originating_number != "" and ? regexp originating_number and orig_type="2"' | paramMap: (p) => [p.span, p.sentdigits, p.orignum] |
| 36 | where: 'tgrp = "" and span != "" and ? regexp span and channel = "" and sent_digits = "" and originating_number = ""' | paramMap: (p) => [p.span] |
| 37 | where: 'tgrp = "" and span = "" and channel = "" and sent_digits != "" and ? regexp sent_digits and originating_number != "" and ? regexp originating_number and sent_type = "1" and orig_type="1"' | paramMap: (p) => [p.sentdigits, p.orignum] |
| 38 | where: 'tgrp = "" and span = "" and channel = "" and sent_digits != "" and ? regexp sent_digits and originating_number != "" and ? regexp originating_number and sent_type = "2" and orig_type="1"' | paramMap: (p) => [p.sentdigits, p.orignum] |
| 39 | where: 'tgrp = "" and span = "" and channel = "" and sent_digits != "" and ? regexp sent_digits and originating_number != "" and ? regexp originating_number and sent_type = "3" and orig_type="1"' | paramMap: (p) => [p.sentdigits, p.orignum] |

-continued

| Search Criteria | Where | paraMap |
|---|---|---|
| 40 | where: 'tgrp = "" and span = "" and channel = "" and sent_digits != "" and ? regexp sent_digits and originating_number != "" and ? regexp originating_number and sent_type = "1" and orig_type="2"' | paramMap: (p)=> [p.sentdigits, p.orignum] |
| 41 | where: 'tgrp = "" and span = "" and channel = "" and sent_digits != "" and ? regexp sent_digits and originating_number != "" and ? regexp originating_number and sent_type = "2" and orig_type="2"' | paramMap: (p) => [p.sentdigits, p.orignum] |
| 42 | where: 'tgrp = "" and span = "" and channel = "" and sent_digits != "" and ? regexp sent_digits and originating_number != "" and ? regexp originating_number and sent_type = "3" and orig_type="2"' | paramMap: (p) => [p.sentdigits, p.orignum] |
| 43 | where: 'tgrp = "" and span = "" and channel = "" and sent_digits != "" and ? regexp sent_digits and originating_number = "" and sent_type = "1"' | paramMap: (p) => [p.sentdigits] |
| 44 | where: 'tgrp = "" and span = "" and channel = "" and sent_digits != "" and ? regexp sent_digits and originating_number = "" and sent_type = "2"' | paramMap: (p) => [p.sentdigits] |
| 45 | where: 'tgrp = "" and span = "" and channel = "" and sent_digits != "" and ? regexp sent_digits and originating_number = "" and sent_type = "3"' | paramMap: (p)=> [p.sentdigits] |
| 46 | where: 'call_identification_code = "OA-CALL-TO-001.01"' | paramMap: (p) => [ ] |

Next, process 300 can search for an inbound route in database 324 at 322. Searching database 324 of inbound routes can be performed in any suitable manner, in some embodiments. For example, in some embodiments, searching database 324 of inbound routes can be performed using the selected search criteria from the table above as shown in the following code snippet:

```
//query running code
const query = (key, params) => {
    return new Promise((resolve, reject) => {
        db.query(
            'select * from [database 324] ir join destination_system_component idi on
ir.destination_system_component_id = idi.id where ${ queries[key].where}',
            queries[key].paramMap(params)
        )
            .then((rows) => {
                if (rows.length) {
                    log.identification('data found with query#:${key}, stopping here');
                    resolve(rows[0]);
                } else resolve(null);
            })
            .catch((err) => reject(err));
    });
};
//loop that runs the above code with refernce to the 46 queries
module.exports = async function(params) {
    let route = [ ];
    for (let key of Object.keys(queries)) {
        route = await query(key, params);
        if (route) break;
    }
    if (!route || (route && route.length === 0))
        log.identification("no queries matched for inbound route logic");
    return route;
};
```

In some embodiments, the following parameters can be used as part of the query: context, span, tgrp, originating number, sent digits, channel, and uuid.

After searching for an inbound route at 322, process 300 can determine if a route was found at 325. If not, process 300 can determine if it is done searching for an inbound route. Any suitable criteria or criterion can be used to make this determination, such as a given number of searches having been performed (e.g., 46 as shown in the table above).

If it is determined at 328 that process 300 is not done searching, then process 300 can select the next search criteria (e.g., the second entry in the table above) at 330 and loop back to 322 and proceed as described above. Otherwise, if it is determined at 328 that process 300 is done searching, then process 300 can determine to use a default inbound route at 332. Any suitable default inbound route can be used in some embodiments.

After determining that an inbound route was found at 325, determining to use a default outbound route at 332, or determining that a route override was found at 320, in some embodiments, process 300 can create an external dial plan at 326. Any external dial plan can be created in any suitable manner, can have any suitable content, and can be created in any suitable format, in some embodiments. For example, in some embodiments, an external dial plan can be created based on an inbound route found at 322, a default inbound route selected at 332, or a route override found at 316. As another example, in some embodiments, the external dial plan can include any suitable content, such as where to route the call (switch) and what number to forward the call to, in some embodiments. As still another example, in some embodiments, the external dial plan can be created in a JSON format, or any other suitable format.

After the external dial plan is created at 326, process 300 can continue to 314 and proceed as described above.

It should be understood that at least some of the above-described blocks of the process of FIG. 3 can be executed or performed in any order or sequence not limited to the order and sequence shown in and described in the figure. Also, some of the above blocks of the process of FIG. 3 can be executed or performed substantially simultaneously where appropriate or in parallel to reduce latency and processing times. Additionally or alternatively, some of the above described blocks of the process of FIG. 3 can be omitted.

While FIG. 3 illustrates three databases 310, 318, and 324, it should be apparent to one of ordinary skill in the art that any two or more of these could be combined into a single database in some embodiments.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EE-PROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

As can be seen, the mechanisms described herein can be used to improve the performance of a call router of a telephone system by enabling the call system to route calls based on entries in one or more databases instead of hard-coded rules.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A system for routing calls, comprising:
a memory; and
at least one hardware processor that is coupled to the memory and that is configured to at least:

receive a first message containing first information corresponding to a first telephone call;
perform a series of queries based on at least a portion of the first information to determine whether the first telephone call matches a route in a first database, wherein at least one of the queries uses a first regular expression;
identify a first route in response to performing the series of queries; and
create a first dial plan based on the first route.

2. The system of claim 1, wherein the at least one hardware processor is further configured to determine whether an override route applies to the first telephone call prior to performing the series of queries.

3. The system of claim 1, wherein the first telephone call is an external call.

4. The system of claim 3, wherein the at least one hardware processor is further configured to:
receive a second message containing second information corresponding to a second telephone call, wherein the second telephone call is an internal call;
perform a query based on at least a portion of the second information to determine whether the second telephone call matches a route in a second database;
identify a second route in response to performing the query; and
create a second dial plan based on the second route.

5. The system of claim 1, wherein the first information includes trunk group information and the first regular expression is evaluated against the trunk group information.

6. The system of claim 1, wherein the first information includes span information and the first regular expression is evaluated against the span information.

7. The system of claim 1, wherein the first information includes sent digits information and the first regular expression is evaluated against the sent digits information.

8. A method for routing calls, comprising:
receiving a first message containing first information corresponding to a first telephone call;
performing a series of queries based on at least a portion of the first information to determine whether the first telephone call matches a route in a first database, wherein at least one of the queries uses a first regular expression;
identifying a first route in response to performing the series of queries; and
creating a first dial plan based on the first route.

9. The method of claim 8, further comprising determining whether an override route applies to the first telephone call prior to performing the series of queries.

10. The method of claim 8, wherein the first telephone call is an external call.

11. The method of claim 10, further comprising:
receiving a second message containing second information corresponding to a second telephone call, wherein the second telephone call is an internal call;
performing a query based on at least a portion of the second information to determine whether the second telephone call matches a route in a second database;
identifying a second route in response to performing the query; and
creating a second dial plan based on the second route.

12. The method of claim 8, wherein the first information includes trunk group information and the first regular expression is evaluated against the trunk group information.

13. The method of claim 8, wherein the first information includes span information and the first regular expression is evaluated against the span information.

14. The method of claim 8, wherein the first information includes sent digits information and the first regular expression is evaluated against the sent digits information.

15. A non-transitory computer-readable medium containing computer executable instructions that, when executed by a processor, cause the processor to perform a method for routing calls, the method comprising:

receiving a first message containing first information corresponding to a first telephone call;

performing a series of queries based on at least a portion of the first information to determine whether the first telephone call matches a route in a first database, wherein at least one of the queries uses a first regular expression;

identifying a first route in response to performing the series of queries; and creating a first dial plan based on the first route.

16. The non-transitory computer-readable medium of claim 15, wherein the method further comprises determining whether an override route applies to the first telephone call prior to performing the series of queries.

17. The non-transitory computer-readable medium of claim 15, wherein the first telephone call is an external call.

18. The non-transitory computer-readable medium of claim 17, wherein the method further comprises:

receiving a second message containing second information corresponding to a second telephone call, wherein the second telephone call is an internal call;

performing a query based on at least a portion of the second information to determine whether the second telephone call matches a route in a second database;

identifying a second route in response to performing the query; and creating a second dial plan based on the second route.

19. The non-transitory computer-readable medium of claim 15, wherein the first information includes trunk group information and the first regular expression is evaluated against the trunk group information.

20. The non-transitory computer-readable medium of claim 15, wherein the first information includes span information and the first regular expression is evaluated against the span information.

21. The non-transitory computer-readable medium of claim 15, wherein the first information includes sent digits information and the first regular expression is evaluated against the sent digits information.

* * * * *